United States Patent [19]

Chilton

[11] Patent Number: 4,601,505
[45] Date of Patent: Jul. 22, 1986

[54] INDUSTRIAL SAFETY PULL HOOK

[76] Inventor: Moir E. Chilton, Rte. #1, Box 85, Ararat, N.C. 27007

[21] Appl. No.: 641,218

[22] Filed: Aug. 16, 1984

[51] Int. Cl.$^4$ ............................................. B65G 7/12
[52] U.S. Cl. .................................................. 294/26
[58] Field of Search ...................... 294/26, 16, 15, 61, 294/103, 104, 110; 43/5, 6, 15, 37; 81/3.48, 3.49

[56] References Cited

U.S. PATENT DOCUMENTS

| | | | |
|---|---|---|---|
| 2,723,152 | 11/1955 | Doty | 294/26 |
| 4,098,442 | 7/1978 | Moore | 294/26 |
| 4,148,512 | 4/1979 | Pendlebury | 294/26 |

*Primary Examiner*—James B. Marbert
*Attorney, Agent, or Firm*—Harvey B. Jacobson

[57] ABSTRACT

An elongated shank is provided having a first handle end and a second hook end including a rigid, reversely turned and inclined hook defining terminal end projecting outward to one side of the shank and toward the first end thereof. The handle includes mounting structure thereon intermediate the handle and hook defining a guide passage closely spaced outward of and paralleling the aforementioned one side of the shank and through which an elongated pull member is lengthwise reciprocated. A first end of the pull member corresponding to the first handle end includes a finger-engageable portion for manually engaging the pull member and lengthwise displacing the latter in a first direction away from the hook and the second end of the pull member includes a laterally outwardly inclined end member thereon projecting outwardly from the side of the pull member remote from the shank and oppositely inclined relative to and toward the hook. The terminal ends of the end member and hook are engageable with each other to limit shifting of the pull member in the second direction toward the hook and spring structure is operatively connected between the pull member and the shank yieldingly biasing the pull member in the second direction. The abutting free terminal ends of the end member and hook define an included angle of generally 90° opening toward the shank and substantially bisected by a plane disposed normal to the shank.

8 Claims, 5 Drawing Figures

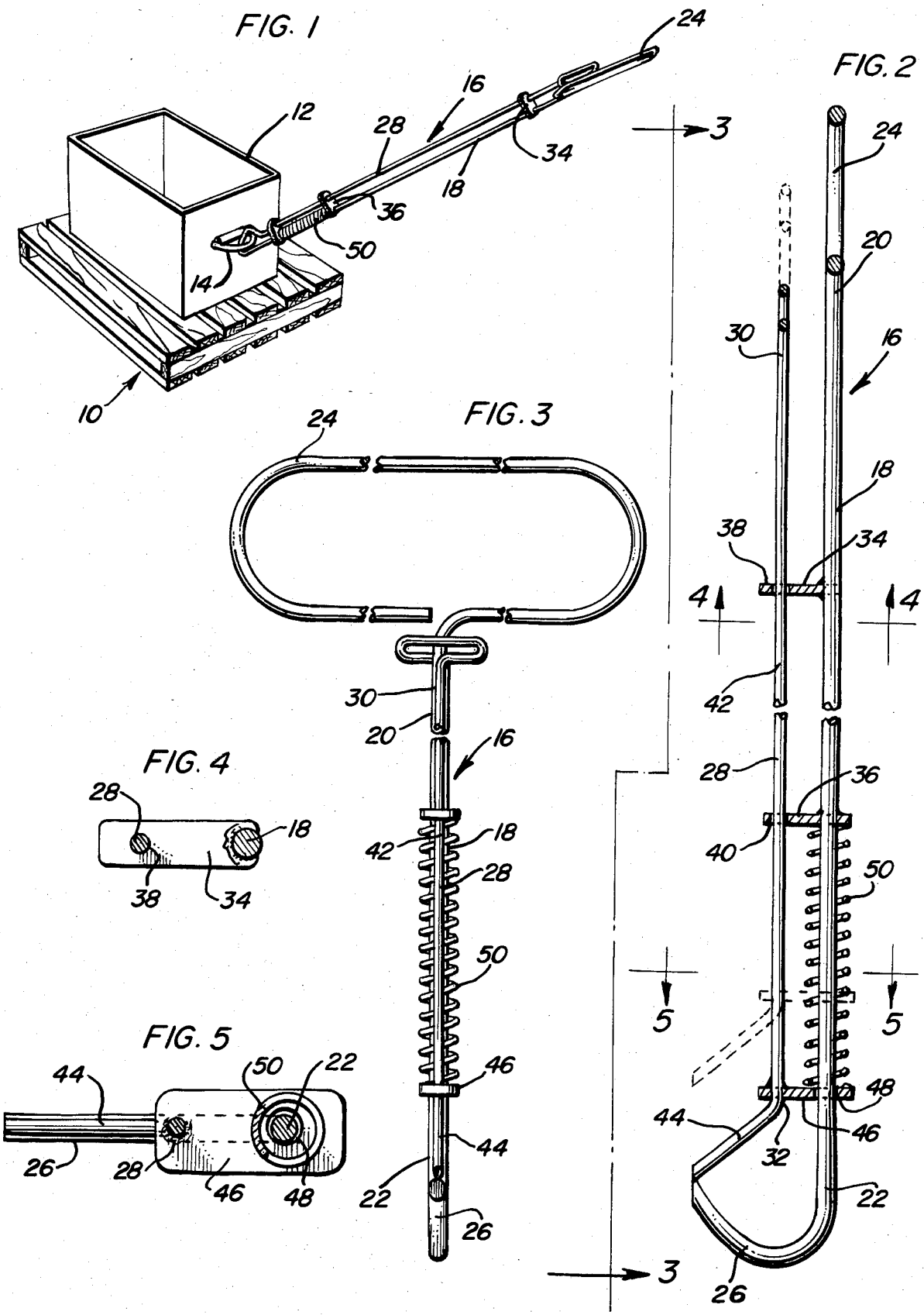

INDUSTRIAL SAFETY PULL HOOK

BACKGROUND OF THE INVENTION

In the manufacturing industry it is often necessary for objects to be engaged and pulled in specific directions and to be further manipulated from a remote location, for safety purposes. Accordingly, a need exists for an industrial pull hook which may be manually operated to engage and pull objects from remote locations.

Various different forms of pull hooks including some of the general structural and operational features of the instant invention heretofore have been provided such as those disclosed in U.S. Pat. Nos. 1,182,790, 2,983,243, 3,374,022, 3,582,124, 3,727,963 and 4,240,658. However, these previously known forms of pull hooks are not specifically designed to perform the intended function of the instant invention.

BRIEF DESCRIPTION OF THE INVENTION

The pull hook of the instant invention includes an elongated shank having a loop-type handle on one end and a second rigid reversely turned and inclined hook-defining terminal end on the second end thereof. The hook is inclined back toward the handle end of the shank and projects outwardly to one side of the shank. In addition, longitudinally spaced guides are carried by the shank and project outwardly of the aforementioned one side thereof. The guides have aligned bores formed therethrough generally paralleling the shank and an elongated pull member is slidably received through the bores and includes a finger-engageable portion on its end adjacent the handle end of the shank and an inclined rigid terminal end on the end thereof adjacent the hook. The hook and inclined terminal end of the pull member are oppositely inclined approximately 45° relative to the shank and the free ends of the hook and terminal end are engageable with each other to limit shifting of the pull member toward the hook. Also, the end of the pull member closely adjacent the terminal end thereof includes an outstanding guide member projecting toward and guidingly engaged with the shank to prevent angular displacement of the pull member about its longitudinal axis relative to the shank. The pull member includes a coiled compression spring disposed thereabout with one of its opposite ends engaged with the guide member and its other end engaged with the adjacent guide carried by the shank. The spring serves to yieldingly bias the pull member toward the hook. Finally, the included angle defined between the terminal end and the hook opens toward the hook end of the shank and is bisected by a plane disposed substantially normal to the shank.

The main object of this invention is to provide a manually operable apparatus by which objects may be engaged and pulled from remote locations.

Another object of this invention is to provide a tool of the type described immediately above and which may be utilized in various industrial situations for engaging and pulling many different objects.

A final object of this invention to be specifically enumerated herein is to provide an industrial safety pull hook in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the pull hook of the instant invention with the hook end thereof engaged with an object to be pulled from a supportive pallet;

FIG. 2 is an enlarged fragmentary longitudinal vertical sectional view taken substantially upon a plane extending along the length of the pull hook;

FIG. 3 is a fragmentary front elevational view of the pull hook as seen from the section line 3—3 of FIG. 2;

FIG. 4 is a transverse sectional view taken substantially upon the plane indicated by the section line 4—4 of FIG. 2; and FIG. 5 is a transverse sectional view taken substantially upon the plane indicated by the section line 5—5 of FIG. 2.

DETAILED DESCRIPTION OF THE INVENTION

Referring now more specifically to the drawings the numeral 10 generally designates a pallet used as a support for an object 12 equipped with a handle 14. The object 12 is disposed on the pallet 10 and the latter may be supported from a mobile support (not shown) of any kind such as a conveyor.

When it becomes necessary to pull the object 12 from the pallet 10 this can be done safely only by a workman disposed at a remote location. Accordingly, the safety pull hook of the instant invention and generally referred to by the reference numeral 16 has been designed for this purpose.

The pull hook 16 includes an elongated shank 18 including first and second ends 20 and 22. The first end 20 is provided with a loop type handle 24 and the second end 22 is equipped with an integral reversely bent hook 26 whose free end is inclined toward the handle end of the shank 18. The free end of the hook 26 is inclined approximately 45° relative to the shank 18.

The hook 16 also includes an elongated pull member in the form of a second shank and the second shank or pull member 28 includes a first handle end 30 and a second end 32 remote from the first end 30.

A pair of guide plates 34 and 36 are rigidly supported from the shank 18 at points spaced longitudinally therealong intermediate the first and second ends 20 and 22 thereof. The guide plates 34 and 36 project outwardly from the same side of the shank 18 from which the hook 26 projects and include aligned bores 38 and 40 formed therethrough. The pull member or second shank 28 includes a mid-portion 42 which is slidably received through the bores 40 and the second end of the pull member 28 includes an inclined laterally outwardly projecting end member 44 thereon. Still further, the second end of the pull member 28 includes a guide plate 46 rigidly supported therefrom and the guide plate 46 projects toward the shank 18 and has a bore 48 formed therethrough in which the second end 22 of the shank 18 is slidably received.

A coiled compression spring 50 is disposed about the shank 18 intermediate the guide plates 36 and 46 and serves to yieldingly bias the pull member or shank 28 toward the hook 26. However, the free end of the end member 44 is abuttingly engageable with the free end of the hook 26 to limit movement of the pull member 28 toward the hook 26 to that position of the pull member 42 illustrated in solid lines in FIG. 2. Of course, when the pull member 42 is longitudinally shifted to the phantom line position thereof illustrated in FIG. 2, the free end of the end member 44 is retracted away from the free end of the hook 26 in order to open the latter, the hook 26 being closed by the end member 44 when the latter is in the solid line position thereof illustrated in FIG. 2.

Not only does the guide plate 46 serve as an abutment for the adjacent end of the compression spring 50, but the guide plate 46, in conjunction with the guide plates 34 and 36, serves to operably support the pull member 28 from the shank 18 against angular displacement of the pull member 28 about its longitudinal axis relative to the shank 28.

It will also be noted from FIG. 2 of the drawings that the included angle formed by the abutting free ends of the hook 26 and the end member 44 is approximately 90° in angular extent and substantially bisected by a plane disposed normal to the longitudinal extent of the shank 18. Thus, when the handle 14 of the object 12 is to be released by the hook 26, it is not necessary that the hook 26 be opened by manual retraction of the pull member 28 away from the hook 26. Rather, a lateral force directed upon the hook end of the shank 18 may be accomplished such that the handle 14 wedges between the free ends of the hook 26 and the end member 44 in order to open the hook 26 sufficiently to release the handle 14.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A safety pull hook for engaging and pulling items safely from a remote location, said pull hook including an elongated shank including a first handle end and a second hook end including a rigid reversely turned and inclined hook defining terminal end projecting outwardly to one side of said shank, said shank including mounting means thereon intermediate said handle end and said book end defining a guide passage closely spaced outward from and paralleling said one side, an elongated pull member paralleling said shank and supported from said guide means for lengthwise reciprocation through said passage, a first end of said pull member corresponding to said first handle end including a finger-engageable portion for manually engaging said pull member first end and lengthwise displacing said pull member in a first direction away from said hook, the second end of said pull member corresponding to said second hook end including a laterally outwardly inclined end member thereon projecting outwardly from said one shank side, opposing said hook defining terminal end and being oppositely inclined relative to said terminal end, spring means operatively connected between said pull member and shank yieldingly biasing said pull member in said second direction, said inclined end member and said inclined terminal end being equally oppositely inclined relative to a plane disposed substantially normal to said shank, whereby a lateral force directed upon said second hook end to displace the latter in a direction opposite to the direction to which said one side faces, while a handle engaged by said pull hook is disposed immediately inwardly of the free ends of said end member and terminal end, will allow said handle to wedge between said free ends and cause said pull member to shift in said first direction against the biasing action of said spring means sufficient to allow said handle to slip outwardly between said free ends.

2. The pull hook of claim 1 wherein said inclined end member and terminal end define an included angle of generally 90° opening toward said shank.

3. The pull hook of claim 1 including guide means operatively connected between said pull member and shank, independent of said mounting means, preventing angular displacement of said pull member about its longitudinal axis relative to said shank.

4. The pull hook of claim 3 wherein said guide means includes a guide plate rigidly carried by said second end of said pull member projecting laterally outwardly from the side thereof opposing said shank and having a guide passage formed therethrough in which said second end of said shank is slidably received.

5. The pull hook of claim 4 wherein said spring means operatively connected between said pull member and shank yieldingly biasing said pull member in said second direction comprises a coiled compression spring disposed about said shank and having one end thereof abutted against said guide plate, the other end of said compression spring being anchored relative to said shank.

6. The pull hook of claim 5 wherein said inclined end member and terminal end define an included angle of generally 90° opening toward said shank.

7. The pull hook of claim 6 wherein said included angle is substantially bisected by a plane disposed substantially normal to said shank.

8. The pull hook of claim 1 wherein said first handle end of said shank includes a loop-type handle.

* * * * *